No. 127,944

UNITED STATES PATENT OFFICE.

JOSHUA C. WOOD, OF LARISSA, TEXAS.

IMPROVEMENT IN BEVERAGES AND SIRUPS FROM MUSTANG GRAPES.

Specification forming part of Letters Patent No. 127,944, dated June 11, 1872.

Specification describing an Improved Sirup of Mustang or Post-Oak Grapes, and process of manufacturing same, invented by JOSHUA C. WOOD, of Larissa, in the county of Cherokee and State of Texas.

For each bushel of mustang or post-oak grapes I prepare a sirup—fifty-six pounds of good brown sugar to eight Winchester gallons of water, and after the sugar is dissolved I add the grapes, and stir well each day, for fifteen days, when the sirup is ready to be drawn off, and after clarification ready for use. I prepare a second sirup—five-sevenths the amount of sugar and five-sevenths the amount of water as before—pour it into the vat of skins and suds; stir each day; at the end of twenty-one days draw off and clarify, when it is ready for use. The first drawing yields thirteen and a half gallons of sirup and the second ten and a half gallons. Should the skins of the berries be broken stirring may be omitted, and the sirup drawn at the end of eight days, and at the end of fifteen days. The entire process should be carried on in a cool place, and the grapes kept pressed down in the sirup with planks perforated with small holes and weighted.

Should the sirup when drawn be sweeter than desired, I change the flavor in this manner: I prepare a vat in which smaller proportion of sugar is used than in the former. Thus a more sour sirup will be obtained, which, being blended with the former the desired flavor can be attained.

For regulating the flavor so as to obtain what may be termed a sirup of bitter body, or with a rougher flavor, a vat, in which the proportions of sugar and water are much less than those already mentioned, is prepared. Thus a rough sirup is obtained which, being blended with the former, will change their flavor to liking.

The amount of sugar and acid in the wild vintage being variable by maturity, locality, and season, the second and third vats are important. To any remaining sirup in these vats add sugar, or sirup of sugar and water, to suit.

Having thus described my invention, what I claim as new, and wish to secure by Letters Patent, is—

1. As a new article of manufacture, a sirup made from the mustang or post-oak grape, as specified.

2. The process, herein described, of manufacturing sirup from the mustang or post-oak grape, as specified.

J. C. WOOD.

Witnesses.
  WM. F. THOMPSON,
  J. G. WARRINER.